March 31, 1936.                    E. FERNHOLZ                    2,035,953
              NONRETURN VALVE FOR USE WITH COMPRESSED OR LIQUID GASES
                             Filed Oct. 4, 1934
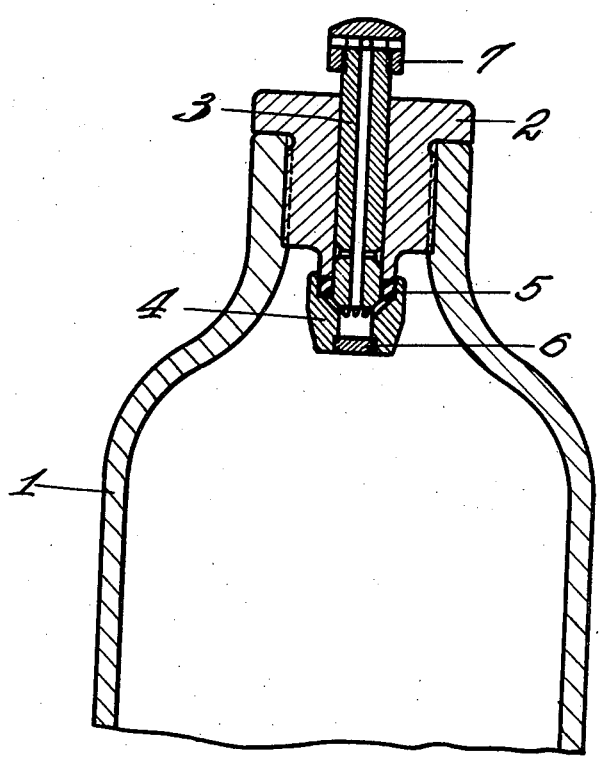
Inventor:
Ernst Fernholz Patented Mar. 31, 1936

2,035,953

UNITED STATES PATENT OFFICE 2,035,953

NONRETURN VALVE FOR USE WITH COMPRESSED OR LIQUID GASES

Ernst Fernholz, Berlin-Tempelhof, Germany

Application October 4, 1934, Serial No. 746,835
In Germany February 7, 1934

1 Claim. (Cl. 251—115)

It has been found in practice that the non-return valves used in apparatus for certain compressed or liquid gases (for instance carbonic acid, ammonia or acetylene) remain in working order only for a comparatively short period. The cause of defect is the packing material for which soft rubber is employed. This soft rubber steadily absorbs the aforementioned gases under pressure and in consequence swells to a volume 2 to 3 times its original volume. In addition the rubber becomes spongy and loses its strength so that, under the pressure acting thereon and the high speed of flow of the passing gases, it very soon becomes fibrous and is ultimately destroyed.

The present invention relates to non-return valves with which soft rubber is also used as a packing material (no substitute of equal quality having yet been found) but which are not accompanied by the aforementioned disadvantages and consequently give lasting satisfaction even when frequently operated.

The underlying idea of the invention is that soft rubber saturated with compressed gas and thereby expanded gives off the absorbed gas on exposure to the atmosphere for a short period, the rubber at the same time assuming its original volume and also recovering its original strength and elasticity.

Accordingly, the invention provides a non-return valve for use with compressed or liquid gases, wherein provision is made for leading off gases absorbed by the valve packing.

Preferably the non-return valve is so constructed that the quantity of the packing material is comparatively small and is housed in an annular groove or in any other suitable manner so that it is almost completely shielded from contact by the compressed or liquid gas, the rear face of the packing ring being in communication with venting or degasifying means enabling any absorbed gas to be quickly given to atmosphere.

Between the absorption and the escape of the gas there exists a certain state of equilibrium. In consequence of the said housing and the very small area of contact of the packing with the gas, the absorption of the gas is very slight, but on the other hand the possibility of the escape of absorbed gas is very great. Therefore, the packing practically contains no gas while the valve is in use, so that it does not swell (as it did heretofore) and retains its original strength and elasticity. The result is that the valve packing is no longer prematurely destroyed but remains lastingly tight and effective.

The accompanying drawing shows one constructional form of the invention in connection with the stopper of a steel bottle for containing compressed or liquid gas.

1 is the steel bottle of any desired capacity and 2 is the stopper screwed into the bottle. The stopper has an axial bore in which is inserted the hollow stem 3 of a non-return valve. Towards the interior of the bottle the stem 3 is provided with an enlarged head 4 having an annular groove serving as a housing for a rubber packing ring 5. The pressure of the gas in the bottle forces the valve head 4 with the packing ring 5 automatically against a co-acting annular projection of the stopper 2, the face of which projection is equal to the upper surface of the packing ring.

For removing the gas from the bottle the valve stem 3 has an annular groove from which radial ports open into the longitudinal bore of the stem. The non-return valve is opened by displacing it axially inwards whereupon the said annular groove in the stem is opened to the interior of the bottle, permitting the gas to pass through the radial ports and the bore of the valve stem. It will be seen that when the valve is opened the packing ring 5 will be forced by the gas pressure automatically into its groove.

From the rear of the packing ring 5 a series of small holes passes into a hollow space in the head 4 which space is closed by a plate 6. In this way communication with the atmosphere is established through the said hollow space and the longitudinal bore of the stem 3. If the stem 3 is screwed into the head 4, the clearance between the threads suffices for the passing of gas absorbed by the packing ring into the hollow space of the head. The stem 3 carries at its outer end a cap 7 having radial outlets.

I claim:

A valve comprising an elongated hollow stem terminating at one end in an enlarged head portion provided with an enclosed space in communication with the hollow portion of the stem, said head portion having an annular flange at its inner end spaced from the stem to provide an annular groove, a soft rubber sealing ring in said groove adapted to engage a valve seat, and a series of passages extending from the space in said head to the groove to provide communication between the groove and the space.

ERNST FERNHOLZ.